(12) United States Patent
Dong et al.

(10) Patent No.: US 11,409,620 B2
(45) Date of Patent: Aug. 9, 2022

(54) POWER CONSUMPTION/POWER BACKUP DEVICE-BASED RIDE-THROUGH SYSTEM

(71) Applicant: Dell Products L.P., Round Rock, TX (US)

(72) Inventors: Wei Dong, Shanghai (CN); Xizhi Cui, Shanghai (CN); Haifang Zhai, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 374 days.

(21) Appl. No.: 16/671,789

(22) Filed: Nov. 1, 2019

(65) Prior Publication Data

US 2021/0064490 A1    Mar. 4, 2021

(30) Foreign Application Priority Data

Aug. 30, 2019    (CN) .......................... 201910816699.1

(51) Int. Cl.
  *G06F 11/20*    (2006.01)
  *G06F 1/3206*    (2019.01)
  *G06F 1/30*    (2006.01)

(52) U.S. Cl.
  CPC ............ *G06F 11/2015* (2013.01); *G06F 1/30* (2013.01); *G06F 1/3206* (2013.01)

(58) Field of Classification Search
  CPC ...... G06F 11/2015; G06F 1/30; G06F 1/3206; G06F 11/20; G06F 1/26; G06F 1/263; G05F 1/66; H02J 9/04; G11C 5/141; G11C 5/14
  See application file for complete search history.

(56) References Cited

U.S. PATENT DOCUMENTS

| | | | | |
|---|---|---|---|---|
| 4,323,987 A * | 4/1982 | Holtz | ........................ | G06F 1/28 365/227 |
| 4,611,289 A * | 9/1986 | Coppola | .................. | G06F 1/30 713/300 |
| 5,295,078 A * | 3/1994 | Stich | ....................... | H02J 9/062 700/297 |
| 5,315,161 A * | 5/1994 | Robinson | .................. | G06F 1/30 307/66 |
| 6,079,026 A * | 6/2000 | Berglund | .................. | G06F 1/30 713/340 |
| 6,195,754 B1 * | 2/2001 | Jardine | ..................... | G06F 1/30 713/324 |

(Continued)

*Primary Examiner* — Jaweed A Abbaszadeh
*Assistant Examiner* — Clifford G Cousins
(74) *Attorney, Agent, or Firm* — Joseph Mencher

(57) ABSTRACT

A power consumption/power backup-based ride-through system includes a power supply system that is configured to supply power to the one or more components. A power backup device is coupled to the one or more components and the power supply system, and operates to monitor an amount of power provided by the power supply system to the one or more components. Based on the amount of power provided by the power supply system to the one or more components, as well as characteristics of the power backup device in some embodiments, the power backup device determines a ride-through time period for which the power backup device is capable of powering the one or more components. When the power backup device detects a loss of power to the one or more components, it powers the one or more components for the ride-through time period.

20 Claims, 8 Drawing Sheets

(56) References Cited

U.S. PATENT DOCUMENTS

| | | | | |
|---|---|---|---|---|
| 6,321,341 B1* | 11/2001 | Kamijo | ............ | G06F 1/28 |
| | | | | 365/227 |
| 7,218,078 B2* | 5/2007 | Gagnon | ............ | H02J 7/005 |
| | | | | 320/132 |
| 7,243,243 B2* | 7/2007 | Gedeon | ............ | G06F 1/3203 |
| | | | | 713/300 |
| 9,141,505 B1* | 9/2015 | Crow | ............ | G06F 11/3058 |
| 9,721,660 B2* | 8/2017 | Kelly | ............ | G06F 13/4282 |
| 2015/0377971 A1* | 12/2015 | Keating | ............ | H02J 7/0047 |
| | | | | 307/130 |
| 2015/0378429 A1* | 12/2015 | Vogman | ............ | G06F 1/28 |
| | | | | 713/320 |

\* cited by examiner

POWER CONSUMPTION/POWER BACKUP DEVICE-BASED RIDE-THROUGH SYSTEM

CROSS-REFERENCE TO RELATED APPLICATIONS

This application claims priority to Chinese Application Serial No. 201910816699.1, filed Aug. 30, 2019, the disclosure of which is incorporated herein by reference in its entirety.

BACKGROUND

The present disclosure relates generally to information handling systems, and more particularly to adaptively determining ride-through time-periods for components in an information handling system based on its power consumption and power delivery characteristics of its power backup device.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, sometimes utilize power backup devices for addressing power losses to components in the server device. For example, Battery Backup Unit (BBU) devices are often provided for memory systems (e.g., Dynamic Random Access Memory (DRAM) devices) in server devices in order to provide ride-through capability for the BBU device and memory system, which refers to the ability of the BBU device to deliver usable power to the memory system for a limited time during a power loss. Conventional BBU devices provide a predetermined amount of ride-through time (typically 10 seconds) to their memory system in the event of a power loss such that, in the event power is restored within that predetermined amount of ride-through time, the memory system operates without interruption while, in the event the power loss continues beyond that predetermined amount of ride-through time, the memory system begins vaulting operations that transfer the data on the memory system to a storage system (e.g., Solid State Drives (SSDs)) in the server device.

However, conventional BBU devices do not consider the operation of the server device at the time of the power loss, or the power delivery characteristics of the BBU device, and the inventors of the present disclosure have recognized that the ride-through time period provided to all memory systems for the predetermined amount of ride-through time discussed above often results in an inefficient use of the BBU devices. For example, some memory systems may be consuming a relatively low amount of power at the time of a power loss, and thus providing ride-through capabilities for the predetermined amount of ride-through time will often cause those memory systems to begin vaulting operations even through the BBU device can support a longer ride-through time, which results in periods of data unavailability during the time that the memory devices transfers their data to the storage system and then must retrieve it back. Furthermore, some BBU devices may experience reduced power delivery capabilities, and providing ride-through capabilities for the predetermined amount of ride-through time may result in those BBU devices being unable to power the memory systems (and particularly memory systems that consume relatively high amounts of power) for the predetermined ride-through time, which may result in data loss.

Accordingly, it would be desirable to provide an improved ride-through system absent the issues discussed above.

SUMMARY

According to one embodiment, an Information Handling System (IHS) includes a processing system; and a memory system that is coupled to the processing system and that includes instructions that, when executed by the processing system, cause the processing system to provide a power backup engine that is configured to: monitor an amount of power provided by a power supply system to one or more components; determine, based on the amount of power provided by the power supply system to the one or more components, a ride-through time period for which a power storage subsystem is capable of powering the one or more components; detect a loss of power to the one or more components; and cause the power storage subsystem to power the one or more components for the ride-through time period.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
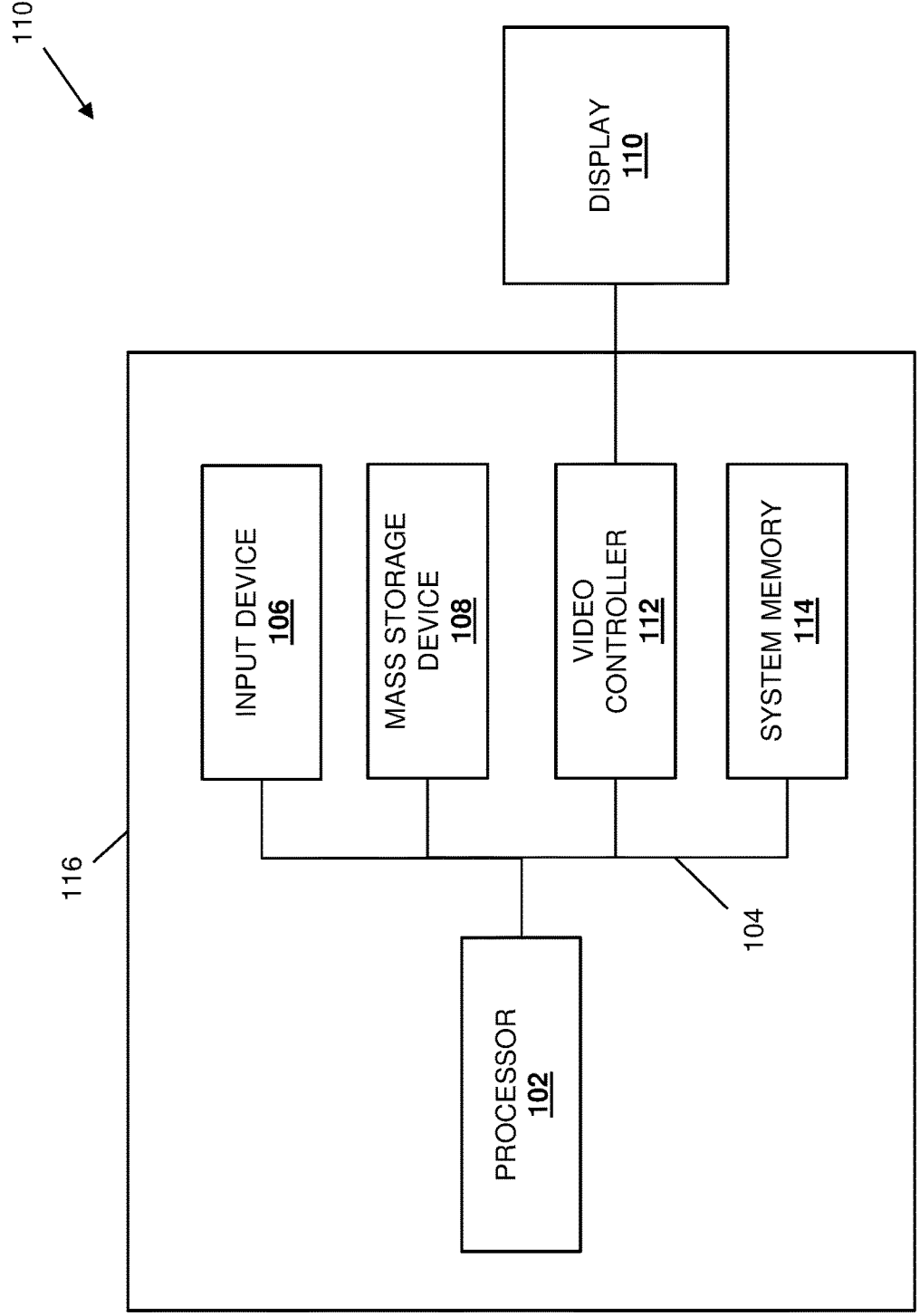
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
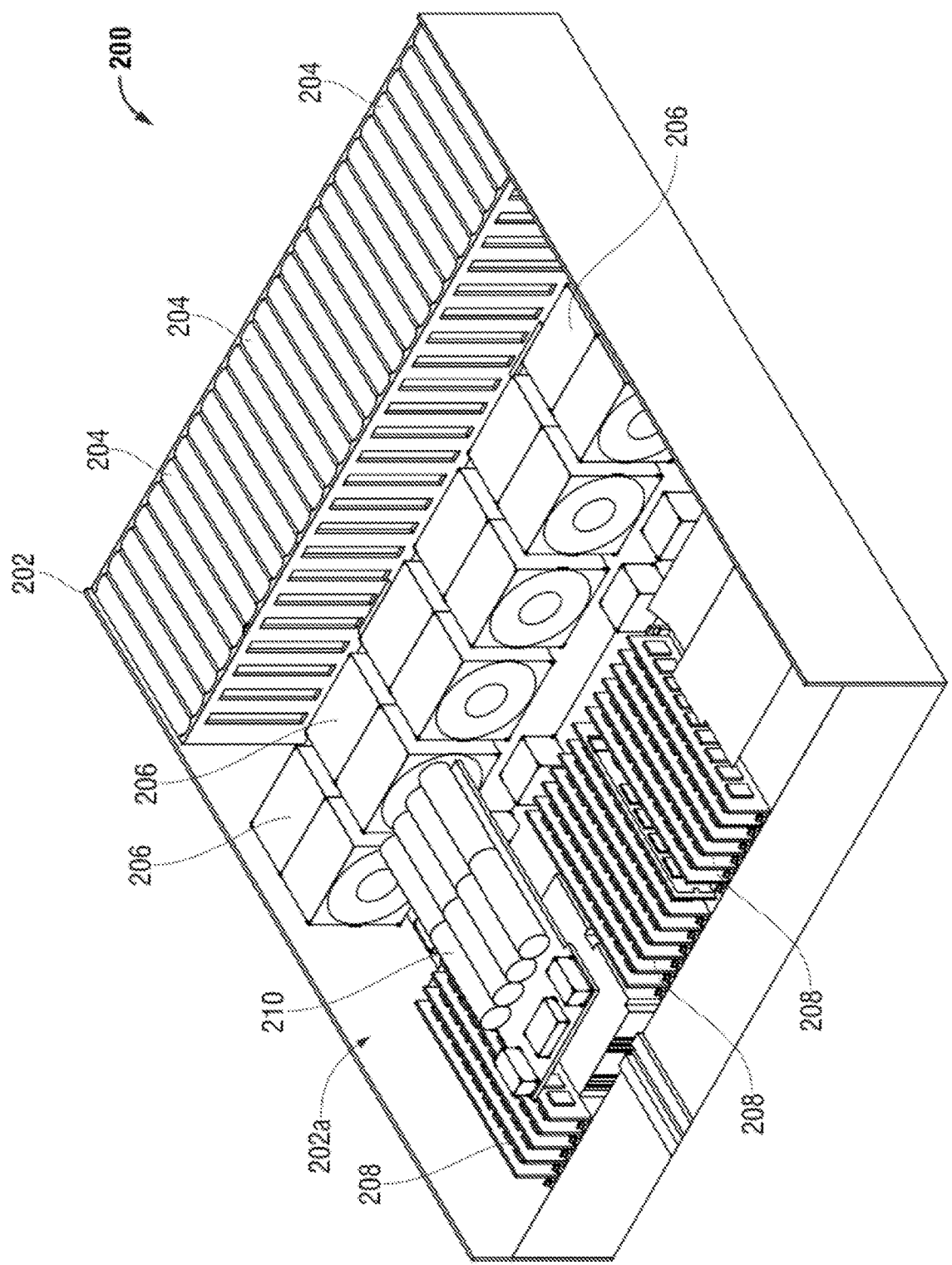
FIG. 2 is a perspective view illustrating an embodiment of a server device that may include the power consumption/power backup device-based ride-through system of the present disclosure.

Referring now to FIG. 2, an embodiment of a server device 200 is illustrated. In an embodiment, the server device 200 may be provided by the IHS 100 discussed above with reference to FIG. 1, and/or may include some or all of the components of the IHS 100. However, while illustrated and discussed as provided in a server device 200, one of skill in the art in possession of the present disclosure will recognize that the power consumption/power backup device-based ride-through system of the present disclosure may be provided in a variety of different devices (e.g., networking devices, storage devices, desktop computing devices, laptop/notebook computing devices, and/or other computing devices that would be apparent to one of skill in the art in possession of the present disclosure) while remaining within the scope of the present disclosure as well. In the illustrated embodiment, the server device 200 includes a chassis 202 that defines a chassis housing 202*a* which, as discussed below, may house any or all of the components of the server device 200.

In the illustrated embodiment, a plurality of components 204 are located in the chassis housing 202*a*. In some examples, the components 204 may be provided by storage devices such as Solid State Drives (SSDs), Hard Disk Drives (HDDs), and/or any other storage device known in the art. However, while described as storage devices, one of skill in the art in possession of the present disclosure will recognize that the components may be provided by any server devices component known in the art while remaining within the scope of the present disclosure as well. Furthermore, FIG. 2 illustrates a plurality of fan devices 206 located in the chassis housing 202*a* adjacent the components 204, as well as a plurality of memory devices 208 and a Battery Backup Unit (BBU) device 210 located in the chassis housing 202*a* and opposite the fan devices 206 from the components 204. However, while discussed as a BBU device below, one of skill in the art in possession of the present disclosure will recognize that the BBU device 210 may be replaced by any of a variety of power backup device technologies while remaining within the scope of the present disclosure as well. While a specific server device 200 has been illustrated and described, one of skill in the art in possession of the present disclosure will recognize that the devices providing the power consumption/power backup device-based ride-through system of the present disclosure may include a variety of components and component configurations while remaining within the scope of the present disclosure as well.

Figure 3:
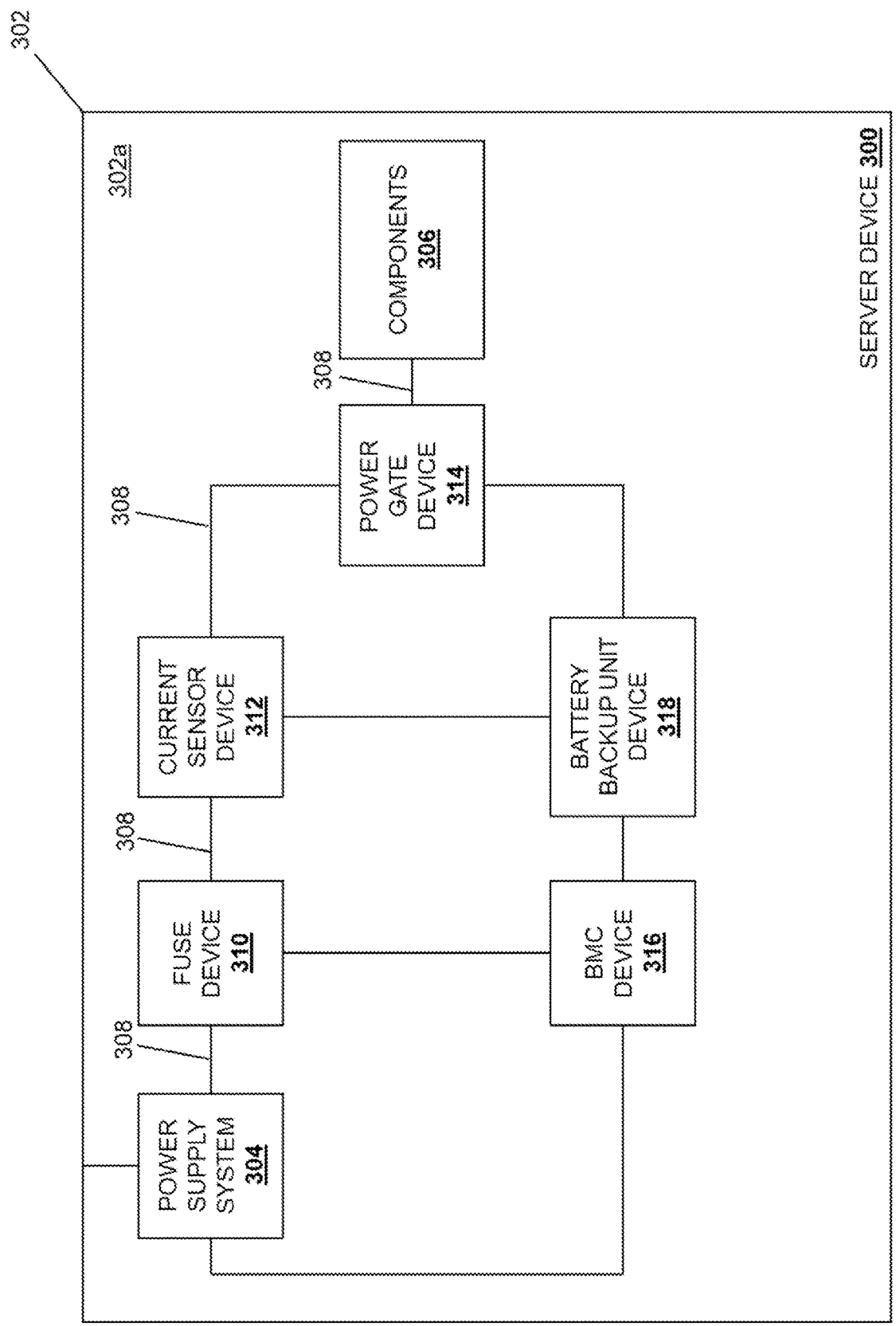
FIG. 3 is a schematic view illustrating an embodiment of a server device that may include the power consumption/power backup device-based ride-through system of the present disclosure.

Referring now to FIG. 3, an embodiment of a server device 300 is illustrated that is similar to the server device 200 discussed above with reference to FIG. 2 and is provided for purposes of the examples discussed below. In an embodiment, the server device 300 may be provided by the IHS 100 discussed above with reference to FIG. 1, and/or may include some or all of the components of the IHS 100. However, while illustrated and discussed as provided in a server device 300, one of skill in the art in possession of the present disclosure will recognize that the power consumption/power backup device-based ride-through system of the present disclosure may be provided in a variety of different devices (e.g., networking devices, storage devices, desktop computing devices, laptop/notebook computing devices, and/or other computing devices that would be apparent to one of skill in the art in possession of the present disclosure) while remaining within the scope of the present disclosure as well. In the illustrated embodiment, the server device 300 includes a chassis 302 that defines a chassis housing 302*a* that houses some or all of the components of the server device 300 as discussed below.

In the illustrated embodiment, a power supply system 304 is located in the chassis housing 302*a* and, as discussed below, may be provided by a pair of redundant Power Supply Units (PSUs) that are configured to supply power to the components of the server device 300. A plurality of components 306 are located in the chassis housing 302*a* and may be provided by any of a variety of server components (including the memory devices (e.g., Dynamic Random Access Memory (DRAM)) discussed herein, as well as processing systems (e.g., Central Processing Units (CPUs), storage devices, etc.) while remaining within the scope of the present disclosure. The power supply system 304 is coupled to the components 306 by a power supply coupling 308 such as, for example, a power rail (e.g., a 12 volt power rail (P12V_IN)) that is configured to deliver power from the power supply system 304 to the components 306. In the embodiments described in the examples below, a fuse device 310 may be located in the chassis housing 302a and provided on and/or coupled to the power supply coupling 308 between the power supply system 304 and the components 306. For example, the fuse device 310 may be provided by an EFuse or other fuse device that one of skill in the art in possession of the present disclosure would recognize that providing the fuse device functionality discussed below. However, one of skill in the art in possession of the present disclosure will recognize that the fuse device functionality, particularly with regard to the power/current consumption verification operations described below, is optional and may be omitted in some embodiments.

In the illustrated embodiment, a current sensor device 312 is located in the chassis housing 302a and provided on and/or coupled to the power supply coupling 308 between the power supply system 304 and the components 306. For example, the current sensor device 312 may be provided by a Hall Effect current sensor device or other power consumption sensor device that one of skill in the art in possession of the present disclosure would recognize provides the current sensor device functionality discussed below, particularly with regard to the real-time power consumption monitoring and reporting that translates current supplied through the power supply coupling 308 into a low voltage reading that provides for stable, repeatable, and accurate power consumption determinations. Furthermore, a power gate device 314 is located in the chassis housing 302a and provided on and/or coupled to the power supply coupling 308 between the power supply system 304 and the components 306. For example, the power gate device 314 may be provided by any of a variety of power gating devices that may provide for the power gate functionality (e.g., the OR'ing operations discussed in the examples below) described herein.

In the embodiments described in the examples below, a Baseboard Management Controller (BMC) device 316 is located in the chassis housing 302a and coupled to each of the power supply system 304 and the fuse device 310. As discussed below, the BMC device 316 may be coupled to the fuse device 310 (e.g., an EFuse) in a manner that allows the BMC device 316 to receive/retrieve a voltage output from the fuse device 310 that is proportional to the current ($I_{MONBUF}$) being provided on the power supply coupling 308, as well as coupled to the power supply system 304 via an Inter-Integrated Circuit (I²C) bus in a manner that allows the BMC device 316 to receive/retrieve current information about the current being provided on the power supply coupling 308 from the power supply system 304. However, while a few examples of reporting current/power to a BMC device have been provided, one of skill in the art in possession of the present disclosure will recognize that the current reporting functionality to the BMC device, particularly with regard to the power/current consumption verification operations described below, is optional and may be omitted in some embodiments. Furthermore, such power/current consumption reporting and verification operations may be provided using a variety of devices other than the fuse device 310, power supply system 304, and BMC device 316 discussed above, and the use of those devices is envisioned as falling within the scope of the present disclosure as well.

As discussed below, a power backup device is located in the chassis housing 302a, and in the illustrated embodiments is provided by a Battery Backup Unit (BBU) device 318 that is coupled to the BMC device 316, the current sensor device 312, and the power gate device 314. The power backup device/BBU device 318 may include a processing system and a memory system that is coupled to the processing system and that includes instructions that, when executed by the processing system, cause the processing system to provide a power backup engine/BBU engine that is configured to perform the functions of the power backup devices/BBU devices discussed below. Furthermore, power backup device/BBU device 318 may also include any of a variety of power storage subsystems (e.g., batteries, capacitors, etc.) that are configured to store power as discussed below. In a specific example in which the power backup device is a BBU device 318, the BBU device 318 may include a Microcontroller Unit (MCU) that provides the BBU engine discussed above.

As illustrated, the BBU device 318 may be coupled to the current sensor device 312 (e.g., a Hall Effect current sensor) in a manner that allows the BBU device 318 to receive/retrieve current/power information about the current/power being provided on the power supply coupling 308 from the power supply system 304, and which may be provided via a coupling between the current sensor device 312 and an Analog-to-Digital Converter (ADC) included in the MCU provided in the BBU device 318. Furthermore, the BBU device 318 (e.g., the MCU provided in the BBU device 318) may be coupled to the BMC device 316 via an I²C bus in a manner that allows the BMC device to receive/retrieve current/power information about the current/power being provided on the power supply coupling 308 from the BBU device 318 (e.g., the MCU provided in the BBU device 318). Further still, the BBU device 318 may be coupled to the power gate device 314 via a BBU power coupling (e.g., V12_BBU) between the BBU device 318 and the power gate device 314. While a specific server device 300 has been described, one of skill in the art in possession of the present disclosure will recognize that server devices (or other devices implementing the power consumption/power backup device-based ride-through system of the present disclosure) may include a variety of components and/or component configurations for providing conventional functionality, as well as the functionality discussed below, while remaining within the scope of the present disclosure as well.

Figure 4:
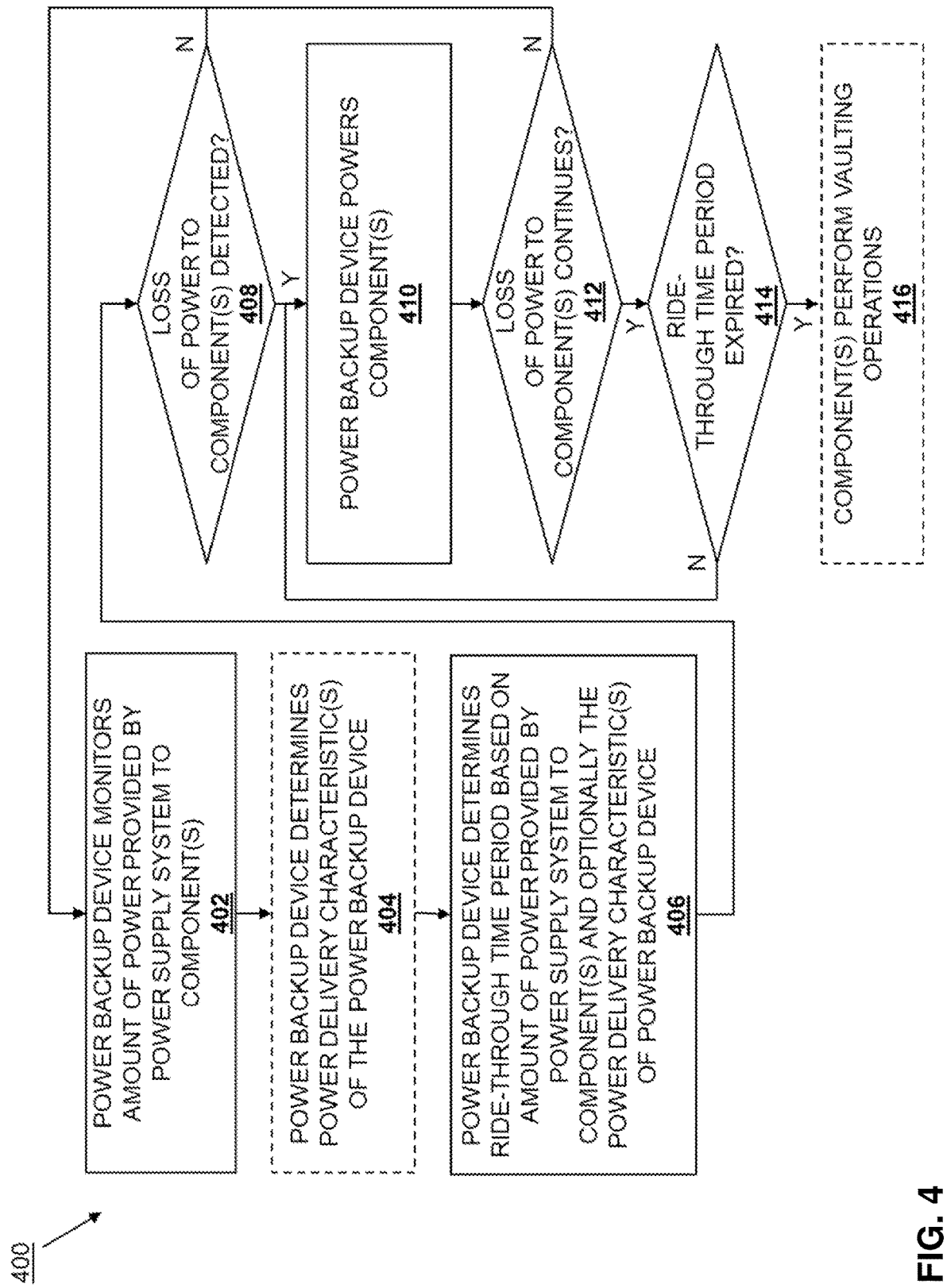
FIG. 4 is a flow chart illustrating an embodiment of a method for providing a power consumption/power backup device-based ride-through for one or more components.

Referring now to FIG. 4, an embodiment of a method 400 for providing power consumption/power backup device-based ride-through for one or more components is illustrated. As discussed below, the systems and methods of the present disclosure provide for the tuning of a ride-through time period provided by a power backup device to one or more components based on the actual power consumption of the system in which that power backup device is located and, in some embodiments, the power delivery characteristics of that power backup device. For example, a power backup device may periodically or continuously monitor an amount of power provided by a power supply system to one or more components in the system that includes the power backup device and, in some cases, may periodically or continuously identify power delivery characteristics of the power backup device. Furthermore, the power backup device may then periodically or continuously determine, based on the amount of power provided by the power supply system to the component(s) and the identified power delivery characteristics of the power backup device, a ride-through time period for which it is capable of powering the one or more components. As such, at any time that the power backup device detects a loss of power to the one or more components, it may cause the power storage subsystem to power the one or more components for the determined ride-through time period. Thus, systems with relatively low power consumption components and/or no degradation in the power delivery characteristics of its power backup device may be provided a ride-through time period that is longer than is provided by conventional power backup devices, while systems with relatively high power consumption components and/or degradation in the power delivery characteristics of its power backup device may be provided a ride-through time period that is shorter than is provided by conventional power backup devices.

Figure 5A:
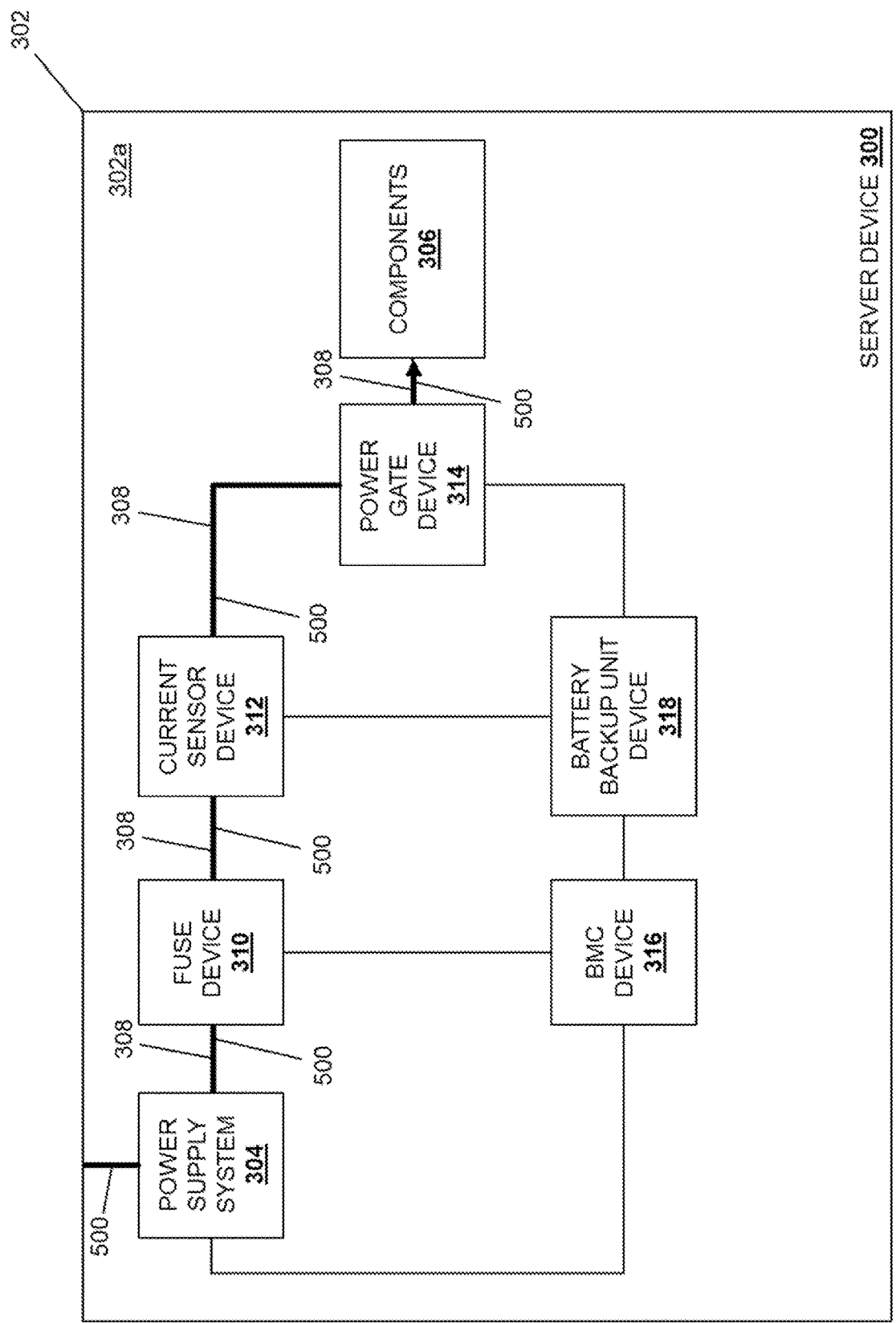
FIG. 5A is a schematic view illustrating an embodiment of the server device of FIG. 3 operating during the method of FIG. 4.

The method 400 begins at block 402 where a power backup device monitors an amount of power provided by a power supply system to one or more components. With reference to FIG. 5A, the power supply system 304 may receive power 500 (e.g., from a power source coupled to the power supply system 304), and may operate to transmit that power 500 via the power supply coupling 308 to the components 306. As will be appreciated by one of skill in the art in possession of the present disclosure and as discussed in further detail below, the transmission of the power 500 from the power supply system 304 to the components 306 includes the transmission of that power through the fuse device 310, the current sensor device 312, and the power gate device 314, with the power gate device 314 configured to provide that power 500 (e.g., rather than power from the BBU device 318) to the components 306 as long as that power 500 is being delivered by the power supply system 304. As such, in an embodiment of block 402, the BBU device 318 may operate to monitor the amount of power 500 being provided by the power supply system 304 to the components 306. In a specific example, the BBU device 318 may operate to monitor a real-time power consumption rate (e.g., a real-time current draw rate) of the components 306, although other power consumption measurements (e.g., real-time voltage draw rate) will fall within the scope of the present disclosure as well.

Figure 5B:
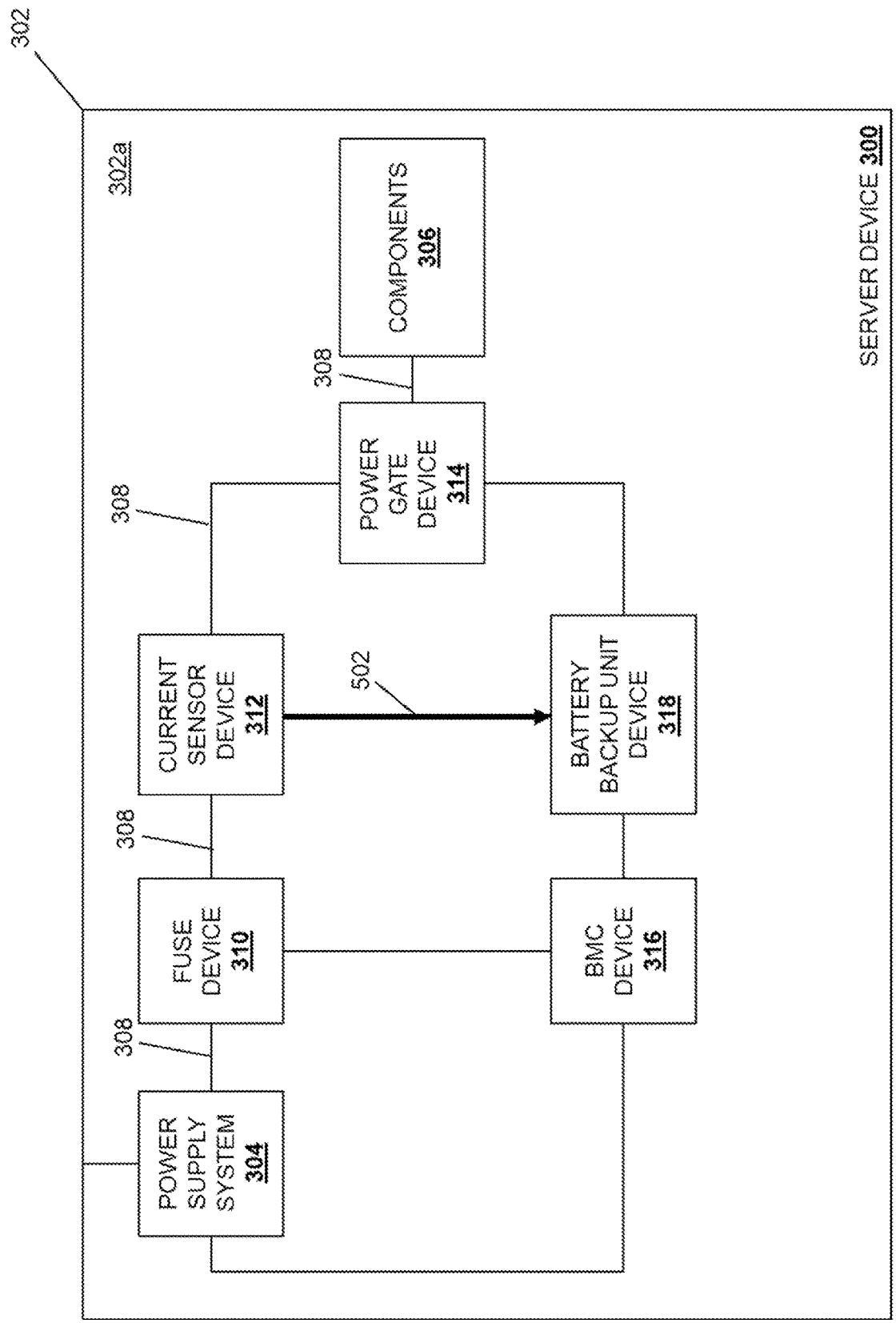
FIG. 5B is a schematic view illustrating an embodiment of the server device of FIG. 3 operating during the method of FIG. 4.

For example, with reference to FIG. 5B, the current sensor device 312 is illustrated as transmitting a report 502 reporting the amount of power being provided by the power supply system 304 to the components 306. As discussed above, in some embodiments, the current sensor device 312 may be provided by a Hall Effect current sensor device that translates a current provided through the power supply coupling 308 (e.g., due to the drawing of power by the components 306 from the power supply system 304) into a voltage that is reported to (e.g., provided to or retrieved by) the BBU engine in the BBU device 318. As such, at block 402, the BBU engine in the BBU device 318 may use the voltage reported by the current sensor device 312 to determine the amount of power being provided by the power supply system 304 to the components 306. However, while a specific example of the determination of the amount of power being provided by the power supply system 304 to the components 306 has been described, one of skill in the art in possession of the present disclosure will recognize that a variety of power measurement techniques will fall within the scope of the present disclosure as well. Furthermore, while illustrated and described as being performed for all of the components in the server device 300, the amount of power being provided by the power supply system 304 may be determined for any subset and/or combination of components in the server device 300 (e.g., the memory devices and storage devices discussed above) while remaining within the scope of the present disclosure as well.

Figure 5C:
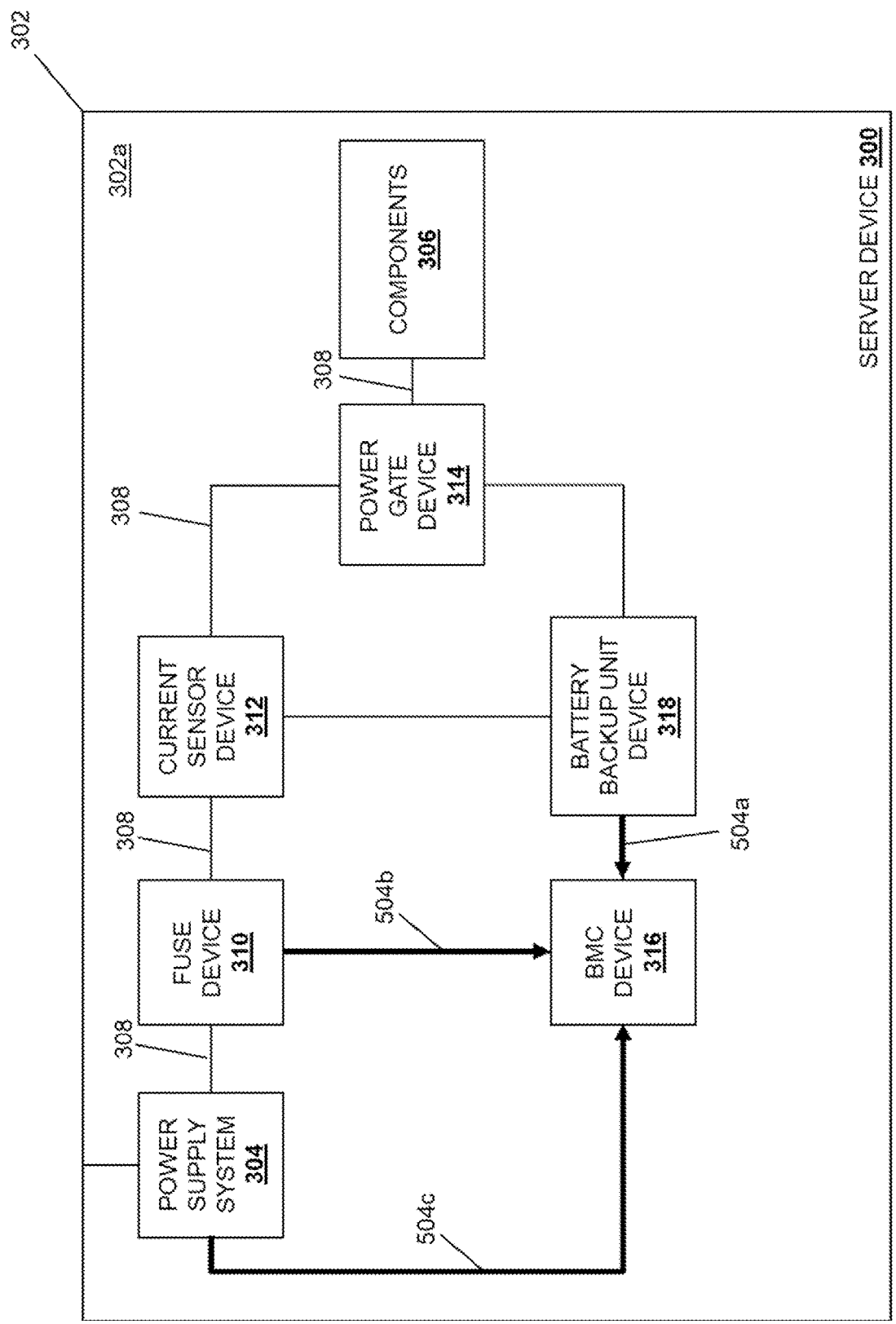
FIG. 5C is a schematic view illustrating an embodiment of the server device of FIG. 3 operating during the method of FIG. 4.

In some embodiments, the amount of power determined by the current sensor device 312/BBU device 318 as being provided by the power supply system 304 to the components 306 at block 402 may be verified. For example, with reference to FIG. 5C, the BMC device 316 is illustrated as receiving/retrieving a first power verification report 504a from the BBU device 318 that may identify the power amount reported by the current sensor device 312 to the BBU device 318 as discussed above, as well as a second power verification report 504b from the fuse device 310, and/or a third power verification report 504c from the power supply system 304. As will be appreciated by one of skill in the art in possession of the present disclosure, the power read from the fuse device 310 (e.g., $I_{MONBUF}$) by the BMC device 316 may not provide a real-time power report, but may be utilized to verify the power amount reported by the current sensor device 312 to the BBU device 318 after-the-fact to verify accuracy of the current measurements by the current sensor device 312. Furthermore, the power read from the power supply system 304 may be retrieved by the BMC device 316 from PSU output registers. As such, in some embodiments, the BMC device 316 may operate to perform verification operations that include determining whether the power amounts reported by the fuse device 310 and the power supply system 304 deviate from each other by more than a threshold amount and, if so, may determine that those power amounts are not valid and, in response, operate to periodically or continuously retrieve new power amounts from the fuse device 310 and the power supply system 304 until they do not deviate from each other by the threshold amount.

If the power amounts reported by the fuse device 310 and the power supply system 304 do not deviate from each other by more than a threshold amount, the BMC device 316 may then operate to perform verification operations that include determining whether the power amounts reported by the fuse device 310 and the power supply system 304 deviate from the power amount reported by the current sensor device 312 by more than a threshold amount. If the power amount reported by the fuse device 310 and the power supply system 304 do not deviate from the power amount reported by the current sensor device 312 by more than the threshold amount, the power backup device health check system may continue to operate as discussed below. However, If the power amounts reported by the fuse device 310 and the power supply system 304 deviate from the power amount reported by the current sensor device 312 by more than the threshold amount, the BMC device 316 may track that deviation (e.g., by generating and updating a deviation count that tracks the deviation of the power amounts reported by the fuse device 310 and power supply system 304 with respect to the power amount reported by the current sensor device 312 over time), and if the deviation over time exceeds threshold deviation(s) over time, the BMC device may generate warning messages (e.g., to an administrator) that identifies those deviations (e.g., a "power consumption reporting accuracy warning" for intermediate levels of deviation over time, a "power consumption reporting accuracy error" for high levels of deviation over time, etc.) However, while a specific example of power consumption reporting verification has been described, one of skill in the art in possession of the present disclosure will recognize that a variety of power consumption reporting verification techniques may be performed while remaining within the scope of the present disclosure as well.

The method 400 may then proceed to optional block 404 where the power backup device determines one or more power delivery characteristics of the power backup device. In an embodiment, at optional block 404, the BBU engine in the BBU device 318 may operate to identify power delivery characteristics of the BBU device 318. For example, at block 404, the BBU engine in the BBU device 318 may identify a temperature of the BBU device 318. In a specific example, the power storage subsystem in the BBU device 318 may include a temperature sensor that is configured to monitor and report a BBU battery cell temperature for batteries in the power storage subsystem in the BBU device 318 and, at block 404, the BBU engine in the BBU device 318 may access that temperature sensor and retrieve that BBU battery cell temperature. However, while a specific technique for the retrieval of a temperature of the BBU device 318 has been described, one of skill in the art in possession of the present disclosure will recognize that a variety of techniques for retrieving a variety of temperatures associated with a BBU device may be utilized while remaining within the scope of the present disclosure as well.

In another example, at block 404, the BBU engine in the BBU device 318 may identify a State Of Health (SOH) of the BBU device 318. As will be appreciated by one of skill in the art in possession of the present disclosure, the power storage subsystem in the BBU device 318 (and/or the BBU device 318 itself) may be associated with a variable referred to as its SOH, which represents the decreased health of the power storage subsystem/BBU device relative to the beginning of its lifecycle (e.g., power storage subsystems/BBU devices may begin their lifecycle with an SOH of 100% and, after 5 years, many power storage subsystems/BBU devices will have an SOH between 30-80%). At block 404 the BBU engine in the BBU device 318 may retrieve, calculate, and/or otherwise identify the SOH of the power storage subsystem/BBU device 318. However, while a particular measurement that represents the health of the BBU device 318 or its power storage subsystem has been described, one of skill in the art in possession of the present disclosure will recognize that different power storage subsystem/BBU device health measurements may be utilized while remaining within the scope of the present disclosure as well.

In another example, at block 404, the BBU engine in the BBU device 318 may identify a State Of Charge (SOC) of the BBU device 318. As will be appreciated by one of skill in the art in possession of the present disclosure, the power storage subsystem in the BBU device 318 (and/or the BBU device 318 itself) may be associated with a variable referred to as its SOC, which represents the charging capabilities of the power storage subsystem/BBU device relative to its fully charged state (e.g., power storage subsystems/BBU devices may have an SOC of 100% when fully charged, and the SOC may decrease as the power storage subsystems/BBU devices provide their stored charge to components). At block 404, the BBU engine in the BBU device 318 may retrieve, calculate, and/or otherwise identify the SOC of the power storage subsystem/BBU device 318. However, while a particular measurement that represents the charge of the BBU device 318 or its power storage subsystem has been described, one of skill in the art in possession of the present disclosure will recognize that different power storage subsystem/BBU device charge measurements may be utilized while remaining within the scope of the present disclosure as well. Furthermore, while the determination of several specific power delivery characteristics have been described, one of skill in the art in possession of the present disclosure will recognize that other power delivery characteristics, as well as other characteristics of the BBU device 318, may be utilized during the method 400 while remaining within its scope.

The method 400 then proceeds to block 406 where the power backup device determines a ride-through time period based on the amount of power provided by the power supply system to the one or more components, and optionally based on the one or more power delivery characteristics of the power backup device. In an embodiment, at block 406, the BBU engine in the BBU device 318 may operate to utilize the amount of power determined at block 402 and, in some embodiments, the power delivery characteristics determined at block 404, to determine a ride-through time period for the BBU device/components. In a specific example, the determination of the ride-through time period at block 406 may include the BBU engine in the BBU device 318 utilizing the following equation:

$$E_{INITIAL} = a + bW + cT + dW^2 + fT^2$$

For example, in this portion of the ride-through time period determination, the BBU engine in the BBU device 318 may be calculating an initial BBU energy amount ($E_{INITIAL}$) that is a function of the amount of power provided by the power supply system to the components 306 (W) and the temperature of the BBU device 318 (T). Using the specific examples provided above, the initial BBU energy amount ($E_{INITIAL}$) may be a function of the real-time power consumption rate of the components 306 (W) and the BBU battery cell temperature (T).

Furthermore, the equation above for $E_{INITIAL}$ may be an empirical equation, with the coefficients a, b, c, d, and f providing different constants that may be determined for any particular BBU device design (e.g., provided by manufacturers of BBU devices, power storage subsystems in BBU devices, etc.).

Furthermore, in some embodiments, following the determination of $E_{INITIAL}$, the determination of the ride-through time period at block 406 may include the BBU engine in the BBU device 318 utilizing the following equation:

$$SC = E_{INITIAL} * SOH$$

For example, in this portion of the ride-through time period determination, the BBU engine in the BBU device 318 may be calculating a Storage Capacity (SC) that provides a measure of the storage capacity of the power storage subsystem/BBU device 318, and that is a function of the $E_{INITIAL}$ calculated as discussed above, as well as the SOH of the BBU device 318, also discussed above. Further still, in some embodiments, following the determination of the SC for the power storage subsystem/BBU device 318, the determination of the ride-through time period at block 406 may include the BBU engine in the BBU device 318 utilizing the following equation:

$$DC = SC * SOC$$

For example, in this portion of the ride-through time period determination, the BBU engine in the BBU device 318 may be calculating a Deliverable Capacity (DC) that provides a measure of the capacity of the power storage subsystem/BBU device 318 to deliver power, and that is a function of the SC calculated as discussed above, and the SOC of the BBU device 318, also discussed above. Finally, in some embodiments, following the determination of DC for the power storage subsystem/BBU device 318, the determination of the ride-through time period at block 406 may include the BBU engine in the BBU device 318 utilizing the following equation:

$$T_{RIDE-THROUGH} = DC/W$$

For example, in this portion of the ride-through time period determination, the BBU engine in the BBU device 318 is calculating the ride-through time period ($T_{RIDE-THROUGH}$) that provides the amount of time the power storage subsystem/BBU device 318 is capable of providing power to the component(s) before those component(s) must prepare for a loss of power, and that is a function of the DC calculated as discussed above, and the amount of power provided by the power supply system to the components 306/the real-time power consumption rate of the components 306 (W), also discussed above. As such, combining the equations discussed above, at block 406 the ride-through time period may be determined using the following equation:

$$T_{RIDE-THROUGH} = ((a+bW+cT+dW^2+fT^2)*SOH*SOC)/W$$

However, while specific equation(s) have been described for calculating the ride-through time period, one of skill in the art in possession of the present disclosure will recognize that other calculations may be utilized to determine the ride-through time period while remaining within the scope of the present disclosure as well.

The method 400 then proceeds to decision block 408 where it is determined whether a loss of power to the one or more components has been detected. In an embodiment, at decision block 408, a power interruption to the components 306 may be experienced due to a loss of power from the power source, a failure in the power supply system 304, and/or any of a variety power loss scenarios that would be apparent to one of skill in the art in possession of the present disclosure. As such, at decision block 408, the power backup device health check system may be configured to respond to any such power loss scenario by detecting when power from the power supply system 304 to the components 306 ceases. For example, as discussed above, the power gate device 314 may be configured to perform OR'ing functionality that, in the event power from the power supply system 304 to the components 306 is lost, provides for the drawing of power from the BBU device 318 by the components 306. As such, the power gate device 314 may "determine" that power from the power supply system 304 to the components 306 has been lost when that power ceases to reach the power gate device 314. However, while a particular example of the determination of the loss of power from the power supply system 304 to the components 306 has been described, one of skill in the art in possession of the present disclosure will recognize that such power loss determinations may be performed in a variety of manners that will fall within the scope of the present disclosure as well.

Figure 5D:
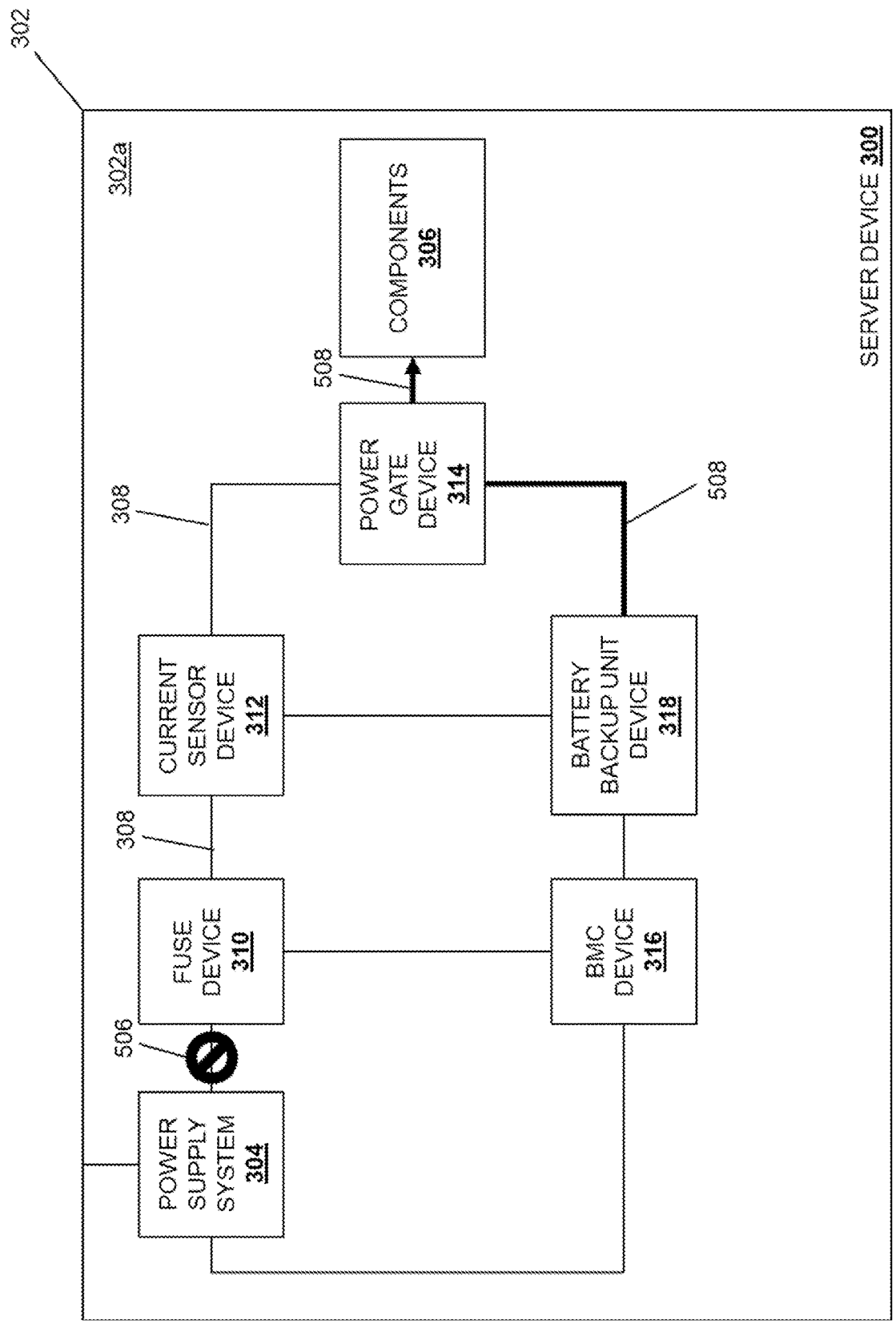
FIG. 5D is a schematic view illustrating an embodiment of the server device of FIG. 3 operating during the method of FIG. 4.

If, at decision block 406, it is determined that no loss of power to the one or more components has been detected, the method 400 returns to block 402. As such, the method 400 may loop through blocks 402, 404, 406, and 408 to monitor power provided by the power supply system to the one or more components, determine one or more power delivery characteristics of the power backup device, and re-determine the ride-through time period as long as no loss of power to the one or more components is detected. However, if at decision block 406, it is determined that a loss of power to the one or more components has been detected, the method 400 proceeds to block 410 where the power backup device powers the one or more components. For example, with reference to FIG. 5D, a loss of power from the power supply system 304 to the components 306 is illustrated as occurring (as indicated by element 506 in FIG. 5D). As discussed above, at block 410, the power gate device 314 may respond to that loss of power from the power supply system 304 to the components 306 by performing OR'ing operations that cause the components 306 to drawn power 508 from the BBU device 318. However, other powering techniques for providing backup power from a power backup device to component(s) at block 410 will fall within the scope of the present disclosure as well.

The method 400 then proceeds to decision block 412 where it is determined whether the loss of power from the power supply system to the components continues. As discussed above, the power gate device 314 may be configured to perform OR'ing operations that provide power from the power supply system 304 to the components 306 any time that power from the power supply system 304 is available. As such, the power gate device 314 may "determine" that power from the power supply system 304 to the components 306 has returned when that power is provided such that it reaches the power gate device 314 which, as discussed above, allows that power to be provided to the components 306 via the OR'ing functionality of the power gate device 314. However, while a particular example of the determination of the return of power from the power supply system 304 to the components 306 has been described, one of skill in the art in possession of the present disclosure will recognize that such power return determinations may be performed in a variety of manners that will fall within the scope of the present disclosure as well.

If, at decision block 412, it is determined that the loss of power from the power supply system 304 to the components 306 no longer continues, the method 400 returns to block 402. As such, the method 400 may loop through blocks 402, 404, 406, 408, 410, and 412 to re-determine the ride-through time period as long as no loss of power to the one or more components is detected, and power the one or more components using the power backup device for less than that ride-through time period when a power loss is detected.

If at decision block 412, it is determined that a loss of power from the power supply system to the one or more components continues, the method 400 proceeds to decision block 414 where it is determined whether the ride-through time period has expired. In an embodiment, at block 410, the BBU engine in the BBU device 318 may operate to begin monitoring the amount of time it provides power to the components 306 and, at decision block 414, the BBU engine in the BBU device 318 may operate to determine whether that amount of time has exceeded the ride-through time period (i.e., such that the ride-through time period has "expired"). If, at decision block 414, it is determined that the ride-though time period has not expired, the method 400 returns to block 410. As such, the method 400 may loop through blocks 410, 412, and 414 such that the BBU device 318 powers the components 306 as long as the loss of power from the power supply system 304 to the components 306 continues and the ride-through time period does not expire.

If at decision block 414, it is determined that the ride through time period has expired, the method 400 proceeds to optional block 416 where the components perform vaulting operations. As discussed above, in some embodiments the components may include memory devices that may prepare for an imminent power loss by performing vaulting operations that include copying their data to non-volatile storage devices. A such, at block 416 and in response to determining that the ride-through time period has expired, the BBU engine in the BBU device 318 may instruct the components (e.g., memory devices) to perform the vaulting operations in preparation for the loss of power (which is imminent due to the BBU device 318 having provided power to those components for the entire ride-through time period.) As such, at optional block 414, the components 306 may receive the instructions from the BBU device 318 and, in response, may perform vaulting operations. As will be appreciated by one of skill in the art in possession of the present disclosure, the power backup device health check system of the present disclosure may provide benefits for systems that include components that perform the vaulting operations discussed above in the event of a power loss. For example, in systems with relatively low power consumption and/or a relatively healthy power backup device, the ride-through time period can be extended, thus avoiding unnecessary vaulting operations and the corresponding periods of data unavailability that accompany them. Furthermore, in systems with relatively high power consumption and/or a relatively unhealthy power backup device, the ride-through time period can be shortened, thus providing for vaulting operations sooner than with conventional power backup devices and avoiding the possibility of data loss.

Thus, systems and methods have been described that provide for the tuning of a ride-through time period provided by a BBU device based on the actual power consumption of the system in which that BBU device is located, and the current power delivery characteristics of that BBU device. For example, a BBU device may periodically or continuously monitor an amount of power provided by a power supply system to one or more components in the system that includes the BBU device and, in some cases, may periodically or continuously identify power delivery characteristics of the BBU device. Furthermore, the BBU device may then periodically or continuously determine, based on the amount of power provided by a power supply system to one or more components and the identified power delivery characteristics of the BBU device, a ride-through time period for which it is capable of powering the one or more components. As such, at any time that the BBU device detects a loss of power to the one or more components, it may cause its power storage subsystem to power the one or more components for the ride-through time period. Thus, systems with relatively low power consumption components and/or no degradation in the power delivery characteristics of its BBU device may be provided a ride-through time period that is longer than is provided by conventional BBU devices, while systems with relatively high power consumption components and/or degradation in the power delivery characteristics of its BBU device may be provided a ride-through time period that is shorter than is provided by conventional BBU devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power consumption/power backup-based ride-through system, comprising:
one or more components;
a power supply system that is coupled to the one or more components and that is configured to supply power to the one or more components; and
a power backup device that is coupled to the one or more components and the power supply system and that includes at least one power storage subsystem, wherein the power backup device is configured to:
monitor a component power consumption amount of power provided by the power supply system to the one or more components;
monitor a power storage subsystem temperature of the power storage subsystem;
determine a ride-through time period for which the power storage subsystem is capable of powering the one or more components using:
an initial energy amount of the power storage subsystem that is a function of the component power consumption amount and the power storage subsystem temperature;
a State Of Health (SOH) of the power storage subsystem;
a State Of Charge (SOC) of the power storage subsystem; and
the component power consumption amount;
detect a loss of power to the one or more components; and
power the one or more components for the ride-through time period.

2. The system of claim 1, wherein the power backup device is configured to:
determine, a plurality of different times, respective ride-through time periods for which the power storage subsystem is capable of powering the one or more components;
detect the loss of power to the one or more components; and
power the one or more components for the respective ride-through time period determined at a most recent time that is included in the plurality of different times.

3. The system of claim 1, wherein the component power consumption amount is a real-time component power consumption.

4. The system of claim 1, wherein:
the SOH of the power storage subsystem indicates a decreased health of the power storage subsystem relative to an initial health of the power storage subsystem that was measured at the beginning of its lifecycle; and
the SOC of the power storage subsystem indicates a charging capability of the power subsystem relative to a full charged state of the power storage subsystem.

5. The system of claim 1, wherein the power backup device is configured to:
determine that the loss of power to the one or more components continues at the end of the ride-through period and, in response, cause the components to perform vaulting operations.

6. The system of claim 1, further comprising:
a current sensor device that is coupled to the power supply system and the power backup device, wherein the power backup device is configured to monitor a first current that is detected by the current sensor device and that provides a real-time measure of the component power consumption amount.

7. The system of claim 6, further comprising:
a Baseboard Management Controller (BMC) device that is coupled to the power backup device, wherein the BMC device is configured to:
receive, from the power backup device, the first current that is detected by the current sensor device and that provides the real-time measure of the component power consumption amount; and
verify the real-time measure of the component power consumption amount using a second current that was received from a current monitoring subsystem and that does not provide a real-time measure of the component power consumption amount.

8. An Information Handling System (IHS), comprising:
a processing system; and
a memory system that is coupled to the processing system and that includes instructions that, when executed by the processing system, cause the processing system to provide a power backup engine that is configured to:
monitor a component power consumption amount of power provided by a power supply system to one or more components;
monitor a power storage subsystem temperature of a power storage subsystem;
determine a ride-through time period for which the power storage subsystem is capable of powering the one or more components using:
an initial energy amount of the power storage subsystem that is a function of the component power consumption amount and the power storage subsystem temperature;
a State Of Health (SOH) of the power storage subsystem;
a State Of Charge (SOC) of the power storage subsystem; and
the component power consumption amount;
detect a loss of power to the one or more components; and
cause the power storage subsystem to power the one or more components for the ride-through time period.

9. The IHS of claim 8, wherein the power backup engine is configured to:
determine, a plurality of different times, respective ride-through time periods for which the power storage subsystem is capable of powering the one or more components;
detect the loss of power to the one or more components; and
cause the power storage subsystem to power the one or more components for the respective ride-through time period determined at a most recent time that is included in the plurality of different times.

10. The IHS of claim 8, wherein the component power consumption amount is a real-time component power consumption amount.

11. The IHS of claim 8, wherein
the SOH of the power storage subsystem indicates a decreased health of the power storage subsystem relative to an initial health of the power storage subsystem that was measured at the beginning of its lifecycle; and
the SOC of the power storage subsystem indicates a charging capability of the power subsystem relative to a full charged state of the power storage subsystem.

12. The IHS of claim 8, wherein the power backup engine is configured to:
determine that the loss of power to the one or more components continues at the end of the ride-through period and, in response, cause the components to perform vaulting operations.

13. The IHS of claim 8, wherein the power backup engine is configured to:
monitor a real-time measure of the component power consumption amount that is provided by a first current detected by a current sensor device.

14. A method for providing a power consumption/power backup-based ride-through for one or more components, comprising:

monitoring, by a power backup device, a component power consumption amount of power provided by a power supply system to one or more components;
monitoring, by the power backup device, a power storage subsystem temperature of a power storage subsystem that is included in the power backup device;
determining, by the power backup device, a ride-through time period for which the power backup device is capable of powering the one or more components using:
an initial energy amount of the power storage subsystem that is a function of the component power consumption amount and the power storage subsystem temperature;
a State Of Health (SOH) of the power storage subsystem;
a State Of Charge (SOC) of the power storage subsystem; and
the component power consumption amount;
detecting, by the power backup device, a loss of power to the one or more components; and
powering, by the power backup device, the one or more components for the ride-through time period.

15. The method of claim 14, further comprising:
determining, by the power backup device a plurality of different times, respective ride-through time periods for which the power storage subsystem is capable of powering the one or more components;
detecting, by the power backup device, the loss of power to the one or more components; and
causing, by the power backup device, the power storage subsystem to power the one or more components for the respective ride-through time period determined at a most recent time that is included in the plurality of different times.

16. The method of claim 14, wherein the component power consumption amount is a real-time component power consumption amount.

17. The method of claim 14, wherein
the SOH of the power storage subsystem indicates a decreased health of the power storage subsystem relative to an initial health of the power storage subsystem that was measured at the beginning of its lifecycle; and
the SOC of the power storage subsystem indicates a charging capability of the power subsystem relative to a full charged state of the power storage subsystem.

18. The method of claim 14, further comprising:
determining, by the power backup device, that the loss of power to the one or more components continues at the end of the ride-through period and, in response, causing the components to perform vaulting operations.

19. The method of claim 14, further comprising:
monitoring, by the power backup device, a real-time measure of the component power consumption amount that is provided by a first current detected by a current sensor device.

20. The method of claim 14, further comprising:
receiving, by a Baseboard Management Controller (BMC) device from the power backup device, the first current that is detected by the current sensor device and that provides the real-time measure of the component power consumption amount; and
verifying, by the BMC device, the real-time measure of the component power consumption amount using a second current that was received from a current monitoring subsystem and that does not provide a real-time measure of the component power consumption amount.

\* \* \* \* \*